(12) United States Patent
Husted (10) Patent No.: US 8,774,331 B2
(45) Date of Patent: Jul. 8, 2014

(54) SYSTEM AND METHOD FOR SINGLE CHAIN SEARCH WITH A MULTIPLE CHAIN RECEIVER

(75) Inventor: Paul J. Husted, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 261 days.

(21) Appl. No.: 13/285,398

(22) Filed: Oct. 31, 2011

(65) Prior Publication Data

US 2013/0107995 A1 May 2, 2013

(51) Int. Cl.
*H04L 27/08* (2006.01)
*H04B 7/08* (2006.01)

(52) U.S. Cl.
CPC .................................. *H04B 7/0871* (2013.01)
USPC ........................... 375/345; 375/349; 375/356

(58) Field of Classification Search
CPC ............ H04L 27/3809; H04L 27/2655; H04L 27/2602; H04L 25/0202; H04L 25/0204; H04L 2025/03426
USPC ................. 375/260, 340, 345, 347, 349, 356; 370/334, 335
See application file for complete search history.

(56) References Cited

U.S. PATENT DOCUMENTS

| | | | |
|---|---|---|---|
| 7,301,924 B1 | 11/2007 | Gurbuz et al. | |
| 7,463,704 B1* | 12/2008 | Tehrani et al. | 375/345 |
| 8,442,141 B1* | 5/2013 | Zhang et al. | 375/267 |
| 2005/0208897 A1* | 9/2005 | Lyons et al. | 455/67.11 |
| 2005/0220208 A1* | 10/2005 | Aoki | 375/267 |
| 2006/0023669 A1* | 2/2006 | Yamaura et al. | 370/335 |
| 2006/0034271 A1* | 2/2006 | DiRenzo et al. | 370/389 |
| 2007/0230403 A1* | 10/2007 | Douglas et al. | 370/334 |
| 2007/0232344 A1* | 10/2007 | Aoki et al. | 455/522 |
| 2007/0286107 A1* | 12/2007 | Singh et al. | 370/312 |
| 2008/0037465 A1* | 2/2008 | Ngo et al. | 370/329 |
| 2008/0232239 A1* | 9/2008 | Mujtaba et al. | 370/209 |
| 2009/0016376 A1* | 1/2009 | Sawai | 370/465 |
| 2009/0304107 A1* | 12/2009 | Aoki et al. | 375/267 |
| 2010/0008400 A1 | 1/2010 | Chari | |
| 2010/0008406 A1* | 1/2010 | Sawai et al. | 375/219 |
| 2011/0293040 A1* | 12/2011 | Dupont et al. | 375/316 |

FOREIGN PATENT DOCUMENTS

EP  1838011 A1  9/2007

OTHER PUBLICATIONS

Cho, M et al., "Symbol timing synchronization for IEEE 802.11n WLAN systems", Internet, 2009. AH-ICI 2009. First Asian Himalayas International Conference on, IEEE, Piscataway, NJ, USA, Nov. 3, 2009, pp. 1-6, XP031570936, ISBN: 978-1-4244-4569-1, abstract sentence I—sentence II.A.
International Search Report and Written Opinion—PCT/US2012/062566—ISA/EPO—Feb. 7, 2013.

(Continued)

*Primary Examiner* — Emmanuel Bayard
(74) *Attorney, Agent, or Firm* — Bay Area Technology Law Group PC (57) ABSTRACT

This disclosure is directed to wireless communication systems having a receiver configured to search for transmitted packets using a single chain and then receive the transmitted packets using multiple chains. Such receivers feature a chain controller that operates a single chain during search mode and turns on additional chains after packet detection. As will be appreciated, the techniques of this disclosure take advantage of the structure of the mixed mode data packet preamble to allow multiple chains to be brought on line after detection of a packet by a single chain.

20 Claims, 4 Drawing Sheets

(56) References Cited

OTHER PUBLICATIONS

Wu, H.C., et al., "Novel carrier frequency offset mitigation in IEEE802.11a/g/n systems," Wireless and Optical Communications Network, 2009. WOCN '09. IFIP International Conference on, IEEE, Piscataway, NJ, USA, Apr. 28, 2009, pp. 1-4, XP031466808, ISBN: 978-1-4244-4704-6 paragraph [0001].

* cited by examiner

SYSTEM AND METHOD FOR SINGLE CHAIN SEARCH WITH A MULTIPLE CHAIN RECEIVER

FIELD OF THE PRESENT INVENTION

This disclosure generally relates to wireless communication systems and more specifically to systems and methods for implementing search for a receiver having multiple receive chains with a single chain.

BACKGROUND OF THE INVENTION

Wireless communication systems employing multiple-input and multiple-output (MIMO) provide significant benefits over single chain communication systems. A MIMO system is characterized by the use antenna arrays for the transmitter and receiver to provide either increased data throughput or increased range. In addition to the obvious benefits of using more chains to transmit more data, MIMO systems often feature improved resistance to fading or other multipath effects. Further, the use of multiple transmit antennas allows beamforming techniques to selectively produce constructive interference and boost signal strength at the receiver.

Implementations of MIMO systems include Wireless Local Area Networks (WLANs) adhering to the IEEE 802.11 (n) standard. This amendment sets a target data rate of at least 100 Mbps at ranges greater than its predecessors, such as 802.11(a) or (g), a goal it seeks to achieve using MIMO technologies. However, the 802.11(n) standard also calls for continued compatibility with legacy systems. As such, an 802.11(n) receiver can be expected to receive packets conforming to multiple protocols. For example, when communicating with another 802.11(n) device, a receiver will receive high throughput packets that require the simultaneous operation of multiple receive chains. On the other hand, when communicating with a legacy device, it will be receiving packets formatted for 802.11(a) or (g) that do not provide a high throughput mode.

Another important aspect of wireless communication systems, particularly with regard to mobile or other battery powered applications, is efficiency. The performance advantages represented by the use of MIMO technologies come at the cost of increased power consumption. By maintaining multiple receive chains in an on state, the rate of power drain for a MIMO receiver can be considerably greater than a legacy receiver. The increased power consumption is most detrimental when the receiver is in search mode as it is simply waiting incoming communications. Since no data is being transmitted while the receiver is waiting for packets, the increased energy use associated with providing power to multiple receive chains is not offset by the increased throughput or performance that results when a link has been established and multiple steams of data are being exchanged.

Current strategies for reducing the power consumption of a MIMO receiver generally rely on a handshake with the transmitter. For example, one scheme involves the transmitter sending a request to send (RTS) signal to initiate a multi stream packet delivery, which is then acknowledged by a clear to send (CTS) signal from the receiver. As will be appreciated, this approach reduces throughput by allocating bandwidth to the handshake process. Further, typical implementations of the scheme result in the receiver remaining in multiple chain mode for a given period of time after receipt of the multi stream RTS.

Therefore, it would be desirable to provide systems and methods for wireless communication that allow a single receive chain to be employed to search for transmitted packets and multiple receive chains to be employed when receiving such packets. In particular, it would be desirable to provide such systems and methods that switch from single chain operation to multiple chain operation as a transmitted packet is being received. It would also be desirable to provide these functions with requiring a handshake between the transmitter and receiver. This invention accomplishes these and other goals.

SUMMARY OF THE INVENTION

In accordance with the above needs and those that will be mentioned and will become apparent below, this disclosure is directed to a method for receiving transmitted data packets including a preamble and a data payload with a wireless receiver having multiple receive chains using a single chain search mode comprising the steps of searching for an incoming data packet with a single receive chain, detecting the preamble of the incoming data packet with the single receive chain, determining automatic gain control for the single receive chain from the incoming data packet preamble, activating additional receive chains, determining automatic gain control for the additional receive chains from the incoming data packet, performing synchronization and channel estimation with all receive chains, and receiving the data payload with all receive chains. Preferably, automatic gain control for the additional receive chains is determined by initiating automatic gain control with automatic gain control information determined for the single receive chain.

In one aspect, the preamble comprises a legacy portion and a high throughput portion and the step of performing synchronization and channel estimation with all receive chains comprises processing the high throughput portion of the preamble. Further, the legacy portion of the preamble can include a short training field followed by a long training field such that the step of activating additional receive chains preferably occurs following reception of the short training field.

In another aspect, wherein the preamble comprises a short training field followed by a long training field, the step of activating additional receive chains preferably occurs during the short training field. Further, synchronization can be performed with the single receive chain during the short training field after activating the additional receive chains. Also preferably, synchronization information obtained for the single receive chain is provided to the additional receive chains. In the noted embodiments, synchronization and channel estimation with all receive chains can be performed by processing the long training field with all receive chains.

Another aspect of the disclosure is directed to a method in which the single receive chain is selected from the multiple receive chains on the basis of signal strength of at least one previously-received data packet. Yet another aspect is directed to selectively enabling the single chain search mode based on channel conditions determined by the receiver.

This disclosure is also directed to a wireless receiver for receiving transmitted data packets including a preamble and a data payload using a single chain search mode, wherein the receiver comprises multiple receive chains, each receive chain having automatic gain control and a signal processor for performing synchronization and channel estimation by processing the preamble of the data packets, and a chain controller; wherein the chain controller is configured to activate a single receive chain to search for an incoming data packet, to detect the preamble of the incoming data packet and to activate additional receive chains after the single receive chain has determined automatic gain control for the incoming data packet and wherein the signal processors for all receive chains perform synchronization and channel estimation with all receive chains to receive the data payload. Preferably, the chain controller is configured to provide automatic gain control information determined for the single receive chain to the additional receive chains for initiating automatic gain control.

In one embodiment, the preamble includes a legacy portion and a high throughput portion such that all the receive chains are configured to perform synchronization and channel estimation by processing the high throughput portion of the preamble. In the noted embodiment, the legacy portion of the preamble can include a short training field followed by a long training field such that the chain controller is preferably configured to activate the additional receive chains following reception of the short training field.

In another embodiment, the preamble includes a short training field followed by a long training field such that the chain controller is configured to activate the additional receive chains during the short training field. Preferably, the single receive chain signal processor is configured to perform synchronization during the short training field after the additional receive chains are activated. Also preferably, the chain controller is configured to provide synchronization information obtained for the single receive chain to the additional receive chains. Further, each signal processor of all the receive chains is configured to perform synchronization and channel estimation by processing the long training field.

Another aspect of the disclosure is directed to such a wireless receiver with the chain controller configured to select the single receive chain from the multiple receive chains on the basis of signal strength of at least one previously-received data packet. Yet another aspect is directed to providing a chain controller configured to selectively enable the single chain search mode based on channel conditions determined by the receiver.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As referenced above, this disclosure is directed to a receiver for use with a wireless communication system employing MIMO technology. The material provided below details operation of such receivers so that a single receive chain is activated for search purposes to provide power savings. As an appropriate data packet is being received, additional receive chains are then powered on in time to receive the packet while taking advantage of MIMO benefits, such as improved throughput. As used herein, the terms "single chain search" and "single chain search mode" refer to this type of functionality. The embodiments that follow are discussed primarily with regard to an 802.11(n) compliant wireless receiver, but one of skill in the art will recognize that the concepts of this disclosure can be applied to any receiver having multiple receive chains that operates under a wireless communication protocol having the necessary packet structure.

The 802.11 standard specifies a Medium Access Control (MAC) layer to segment data into MAC protocol data units (MPDUs). To mediate exchanges between the MAC layer and the physical layer (PHY), a Physical Layer Convergence Protocol (PLCP) processes the MPDUs to ultimately generate PLCP protocol data units (PPDUs) for use by the PHY layer. From each PPDU, the PHY layer generates a packet, or frame, which generally includes a preamble and a data payload.

As is known to those of the skill in the art, a preamble preceding the data in each packet is used by the receiver to perform multiple, critical tasks. For example, the presence and design of the preamble is used by the receiver to detect the packet, to adjust the radio frequency analog section to optimize signal levels, to synchronize timing and frequency between the transmitter and receiver, and to provide information about the data payload.

Under the 802.11(n) standard, three different preamble structures are defined, legacy, Greenfield and mixed. Legacy mode refers to the preamble structure adopted by 802.11(a)/(g) systems. Greenfield is a high throughput mode that does not provide backward compatibility. Accordingly, then, mixed mode represents the most relevant preamble structure current used as it allows 802.11(n) devices to communicate using MIMO techniques to improve throughput and performance but still provides backward compatibility with 802.11 (a)/(g) systems. Given the installed base of devices operating under legacy standards, the ability to provide backward compatibility is likely to remain very beneficial for some time.

Figure 1:
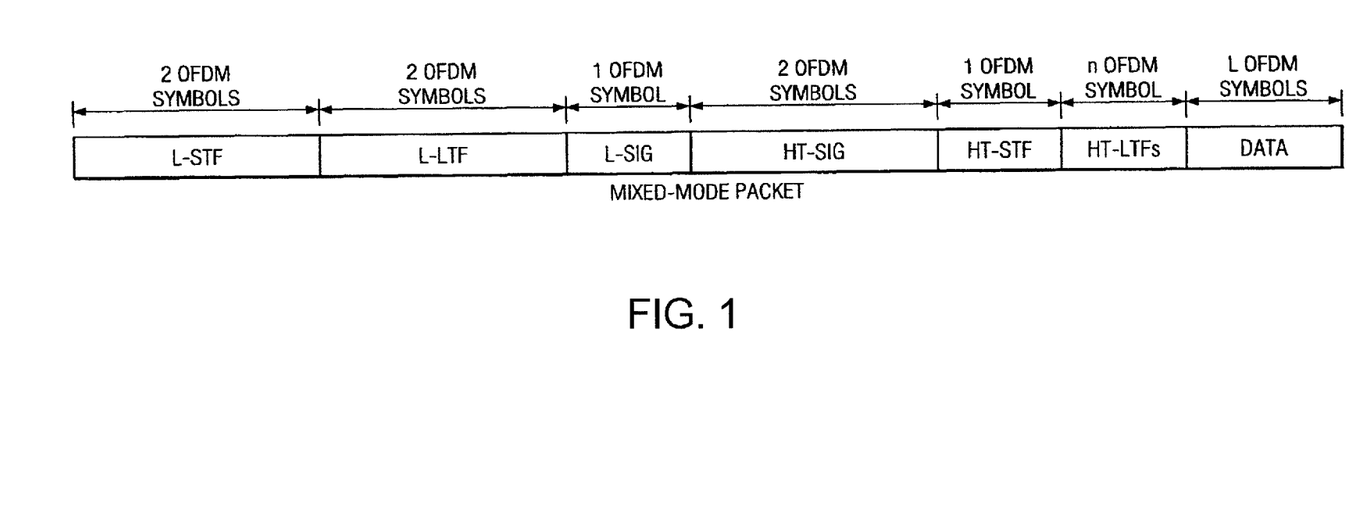
FIG. 1 represents the structure of the preamble of an 802.11(n) packet.

The structure of an 802.11(n) mixed mode preamble is shown in FIG. 1. As depicted, the first portion is equivalent to a legacy preamble and includes a legacy Short Training field (L-STF) comprising 2 OFDM symbols, followed by a legacy Long Training field (L-LTF), which is also 2 OFDM symbols long, and a legacy Signal field (L-SIG) of one OFDM symbol. Following the legacy portion, there is a high throughput portion including, in sequence, a high throughput Signal field (HT-SIG) of 2 OFDM symbols, a high-throughput Short Training field (HT-STF) of one OFDM symbol, and multiple high-throughput Long Training fields (HT-LTF), each of one OFDM symbol. Since each OFDM symbol requires 4 μs for transmission, the relative period for each section of the preamble can readily be determined as being either 8 μs or 4 μs long.

Each legacy training field, the L-STF, L-LTF, and L-SIG, is equivalent to its counterpart in an 802.11(a)/(g) packet. As such, the L-STF consists of 10 0.8 μs short symbols. During the L-STF, the receiver will adjust the amplification and processing of the signal from the antenna through the Automatic Gain Control (AGC) process. The L-STF period is also used with a suitable correlation algorithm to provide a first frequency and timing information synchronization. In some embodiments, this may be termed coarse synchronization. DC offset information may also be determined from the L-STF. Next, the L-LTF consists of two long symbols, each 4 μs in duration. The receiver is preferably configured to use this portion of the preamble to perform a second synchronization, including frequency offset estimation and timing estimation. In some embodiments, this may be termed fine synchronization. During the L-LTF, the receiver also performs channel estimation to help compensate for noise from multipath effects and other channel conditions. Finally, the L-SIG consists of one symbol, 4 μs long. The receiver determines rate and duration information from the L-SIG field.

Following the legacy portion is the high throughput portion, including in order the high throughput Signal field (HT-SIG), the high throughput Short Training field (HT-STF). The HT-SIG consists of two symbols, each 4 μs long, and contains information about the packet and its format. Next, the HT-STF is one symbol long, 4 μs, and is used by the receiver to refine the AGC for each receive chain. Finally, the HT-LTF is used to estimate the channel, however one symbol is required for each spatial stream being transmitted. Accordingly, the HT-LTF consists of n symbols, each 4 μs long, one for each stream. Following the preamble is the variable length data section of the packet, which is shown as corresponding to L OFDM symbols.

As discussed above, this disclosure is directed to systems and methods for providing a receiver configured to search for transmitted packets using a single chain and then receive the transmitted packets using multiple chains. Accordingly, the inventive receivers feature a chain controller that operates a single chain during search mode and turns on additional chains after packet detection. As will be appreciated, the techniques of this disclosure take advantage of the structure of the mixed mode data packet preamble to allow multiple chains to be brought on line after detection of a packet by a single chain.

Figure 2:
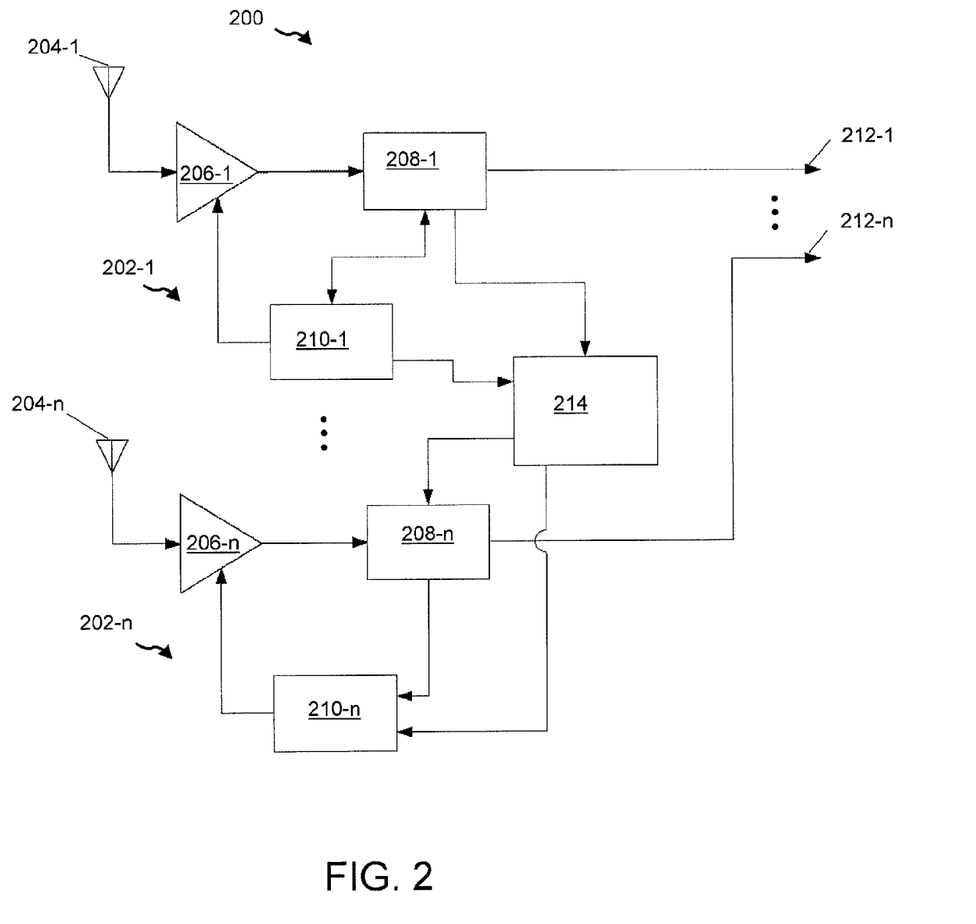
FIG. 2 illustrates a functional diagram of a wireless network device performing single chain search, according to the invention.

Turning now to FIG. 2, specific details of currently preferred embodiments are discussed with reference to receiver 200. Receiver 200 is part of a device operating in wireless network and is generally in communication with one or more other network nodes. For example, receiver 200 can be a station (STA) receiving transmissions from an access point (AP). As shown, receiver 200 has multiple receive chains 202-1 to 202-n. A receive chain can be configured to operate under any number of operating modes, including search and receive modes. During search mode, the receive chain is processing the signal being received by its antenna, in order to detect the start of packets. Under current 802.11(n) standards, MIMO systems are described that use 2, 3 or 4 chains. It is contemplated that in other embodiments, a greater number of chains may be used as desired. Each receive chain typically includes, without limitation, antenna 204-1 to 204-n, variable gain amplifier (VGA) 206-1 to 206-n, signal processor 208-1 to 208-n, and AGC 210-1 to 210-n. Data streams 212-1 to 212-n are output from each chain for further processing and demodulation. As will be discussed in detail below, chain controller 214 coordinates the operation of receive chains 202-1 to 202-n to activate a single chain for search mode and to activate additional chains as a packet is being received. To that end, chain controller 214 preferably communicates between signal processors 208-1 to 208-n and AGC 210-1 to 210-n to share synchronization and AGC information.

Figure 3:
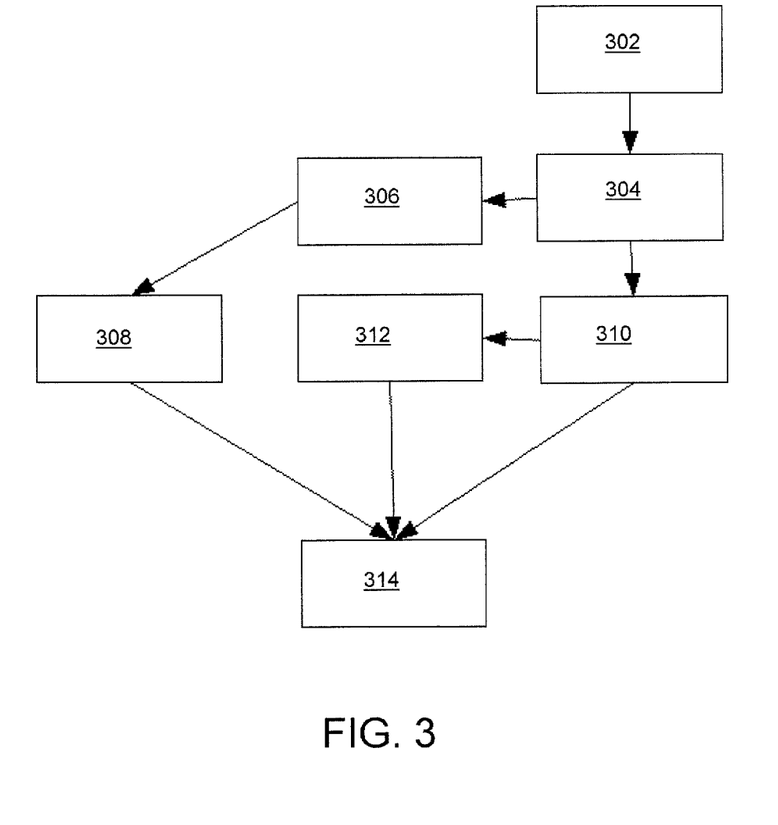
FIG. 3 is a flowchart depicting the steps of performing a single chain search and multiple chain reception, according to the invention.

In one currently preferred embodiment, the single chain search mode operation of receiver 200 is depicted in the flowchart shown in FIG. 3. In this embodiment, receiver 200 may employ the n receive chains during the reception of either 802.11(n) or 802.11(a)/(g) packets. Starting in step 302, chain controller 214 activates receive chain 202-1 in search mode to await the arrival of a packet. Preferably, the chain chosen for activation is based on historical performance. For example, the chain that experienced the strongest signal during the reception of a previous packet may be used as the chain for performing the search. Alternatively, an averaging function over a greater period of time can be used to determine the chain likely to have the best signal reception. Once the L-STF portion of the preamble of an incoming packet is detected, AGC 210-1 operates to adjust the gain of VGA 206-1 in step 304 to amplify the signal received by antenna 204-1 to a suitable level for signal processor 208-1. Typically, settling the AGC for an incoming packet requires the receipt of at least 3 short symbols, and thus takes at least 2.4 µs.

Once receive chain 202-1 has obtained AGC, chain controller 214 turns on receive chains 202-2 to 202-n in step 306. Although receive chains 202-2 to 202-n will not receive the entire L-STF field, they do receive a sufficient portion for AGC 210-2 to 210-n to settle and appropriately adjust VGA 206-2 to VGA 206-n by the end of the L-STF in step 308. Preferably, AGC 210-2 to 210-n initiate the AGC function by receiving information from AGC 210-1 via chain controller 214. Since the receive chains experience similar channel conditions, seeding the AGC function of the additional receive chains with the setting determined from the first chain can help ensure that sufficient time will remain in the L-STF to perform AGC with respect to chains 202-2 to 202-n.

Concurrently with step 308, chain 202-1 continues conventional operation in step 310 such that signal processor 208 performs suitable correlation algorithms on L-STF in order to obtain coarse synchronization between chain 202-1 and the transmitter, including coarse frequency offset and coarse timing estimation. This process is completed by the end of the L-STF. Chain controller 214 then preferably sends the coarse synchronization information from chain 202-1 to chains 202-2 to 202-n in step 312.

Thus, by the end of the L-STF, receive chain 202-1 has determined AGC and coarse synchronization, while receive chains 202-2 to 202-n have also determined AGC and have received coarse synchronization information from chain 202-1. In step 314, then, all receive chains 202-1 to 202-n are able to process the L-LTF with signal processors 208-2 to 208-n to perform channel estimation and fine synchronization, including fine frequency offset and fine timing estimation. Although the coarse synchronization information was determined with respect to receive chain 202-1, these values should be sufficient for correct processing of the L-LTF by chains 202-2 to 202-n. Accordingly, each additional chain preferably performs fine synchronization to refine these values. Depending on the nature of the incoming packet, all chains 202-1 to 202-n then process L-SIG and either the high throughput portion of the preamble and data if it is an 802.11(n) packet or data alone if it is an 802.11(a)/(g) packet.

As will be appreciated, the techniques disclosed with respect to FIG. 3 allow all receive chains to undergo channel estimation and fine synchronization in time for processing the L-SIG portion of the preamble and correspondingly will be able to properly receive the data portion of the incoming packet. Since these functions occur within the time period associated with the legacy portion of the header, all receive chains can be used to receive either 802.11(n) or 802.11(a)/(g) packets. A DC offset estimation is typically performed by each chain during the L-STF as well. Under the above technique, receive chains 202-2 to 202-n preferably perform a DC offset estimation at the end of the L-STF if sufficient time remains. Alternatively, receive chains 202-2 to 202-n perform a coarse DC offset estimation at the beginning of the L-LTF.

Figure 4:
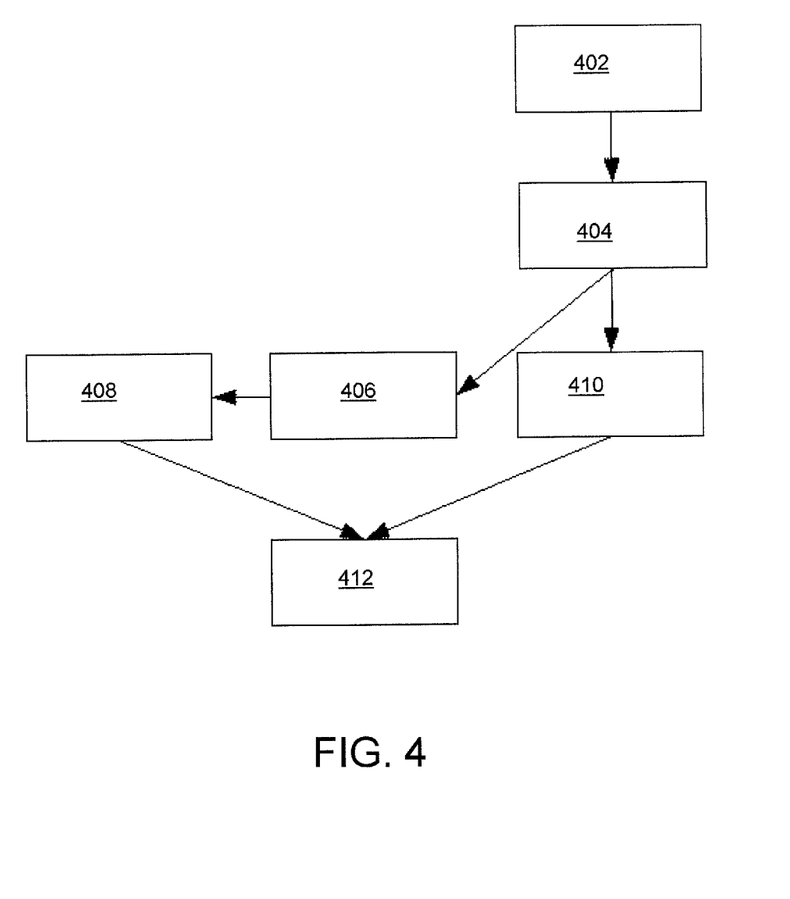
FIG. 4 is a flowchart of another embodiment, depicting the steps of performing a single chain search and multiple chain reception, according to the invention.

Another embodiment of the single chain search mode techniques of this disclosure is depicted in the flowchart shown in FIG. 4. In this embodiment, receiver 200 also employs a single receive chain to search for incoming packets and then employs n receive chains during the reception of 802.11(n) packets. As shown, the routine starts in step 402 with chain controller 214 activating receive chain 202-1 in search mode to await the arrival of a packet. As discussed, the chain experiencing the strongest recent signal is preferably used for performing the search. Upon detection of the L-STF portion of the preamble of an incoming packet is detected, AGC 210-1 operates to adjust the gain of VGA 206-1 in step 404 to amplify the signal received by antenna 204-1 to a suitable level for signal processor 208-1. During the reception of the L-STF in step 404, processor 208-1 also obtains coarse synchronization information.

After reception of the L-STF, chain controller 214 activates chains 202-2 to 202-n in step 406. Next, in step 408, chains 202-2 to 202-n undergo AGC during the L-LTF portion of the preamble. As discussed above, AGC 210-2 to 210-n preferably receive a preliminary AGC setting from AGC 210-1 via chain controller 214.

Simultaneously, in step 410 chain 202-1 continues conventional operation such that signal processor 208 performs channel estimation and fine synchronization on the L-LTF and then processes the L-SIG. Accordingly, by the end of the legacy portion of the preamble, chain 202-1 has AGC, coarse synchronization, channel estimation and fine synchronization while chains 202-2 to 202-n have AGC. In step 412, then, all receive chains can process the high throughput portion of the preamble to obtain further channel estimation and coarse and fine synchronization as warranted. As desired, chains 202-2 to 202-n can utilize the coarse synchronization information from chain 202-1 to facilitate processing of the high throughput preamble.

Although this embodiment is limited to the reception of 802.11(n) packets as the L-LTF is not used for channel estimation or fine synchronization for chains 202-2 to 202-n, additional time is available to settle the AGC for these chains. In a further aspect of this embodiment, this mode is preferably activated if the performance of receiver 200 indicates that the technique shown in FIG. 3 allocates insufficient time to properly perforin AGC for the additional receive chains. Also as discussed above, receive chains 202-2 to 202-n preferably perform a DC offset estimation during the L-LTF.

In a further aspect of this disclosure, the single to multi chain switching functionality is an operating mode that can be selectively enabled and disabled as warranted by channel conditions experienced at the receiver.

As a first example, it will be recognized that the benefits of using a single chain for search are most effectively realized when the receiver has sufficient signal reception. Preferably, the signal to noise ratio (SNR) present at the search antenna should be sufficient to reliably receive the incoming packets. When the receiver is at the edge of range, for example, the benefits of utilizing all receive chains to detect the incoming packets is likely to outweigh the power saving benefits. As such, receiver 200 is preferably configured to use receive chains 202-1 to 202-n conventionally when signal strength is below a threshold. However, when signal strength of approximately 3 dB or more is available, and preferably approximately 10 dB or more, receiver 200 is preferably configured to implement a single chain search mode routine according to the above techniques.

Also preferably, receiver 200 is configured to compensate for potential detrimental effects resulting from the use of a single chain only for search. For example, the MAC layer of an 802.11 device typically provides a Carrier Sense Multiple Access, Collision Avoidance (CSMA/CA) function. Under this scheme, a wireless device listens for potentially conflicting transmissions between other nodes in the network and configures its operation to minimize conflicts. As will be appreciated, proper operation of the protocol hinges upon the ability of the device to detect transmissions of the other nodes, which may be weak at the device. These conditions are referred to as an example of a near/far problem. To minimize the impact of single chain search on CSMA/CA, receiver 200 is preferably configured to analyze performance to detect a near/far condition.

In one embodiment, receiver 200 assesses the quality of its communication with another network node, such as an AP. An estimate of such conditions can be made by monitoring the number of transmissions sent by receiver 200 to the AP and comparing the number of acknowledgements sent by the AP. Too many transmissions not being received by the AP may indicate undetected interfering transmissions from another network node. Receiver 200 can be configured to suspend single chain search mode and to reassess the percentage of acknowledgements received from the AP. When a sufficient improvement occurs, receiver 200 preferably ceases single chain search mode for a desired period of time.

In another embodiment, receiver 200 can be configured to periodically suspend single chain search to determine whether weak signals are present that go undetected when using a single receive chain. When a sufficient number of weak transmission are detected using multiple receive chains, receiver 200 preferably ceases single chain search mode for a desired period of time.

Described herein are presently preferred embodiments. However, one skilled in the art that pertains to the present invention will understand that the principles of this disclosure can be extended easily with appropriate modifications to other applications.

What is claimed is:

1. A method for receiving a transmitted data packet including a preamble and a data payload with a wireless receiver having multiple receive chains using a single chain search mode comprising:
    searching for an incoming data packet with a single receive chain;
    detecting the preamble of the incoming data packet with the single receive chain;
    determining automatic gain control for the single receive chain from the preamble of the incoming data packet;
    activating additional receive chains during the preamble of the incoming data packet;
    determining automatic gain control for the additional receive chains from the preamble of the incoming data packet;
    performing synchronization and channel estimation with all receive chains during the preamble of the incoming data packet; and
    receiving the data payload with all receive chains.

2. The method of claim 1, wherein determining automatic gain control for the additional receive chains comprises initiating automatic gain control for the additional receive chains with information determined for the single receive chain.

3. The method of claim 1, wherein the preamble comprises a legacy portion and a high throughput portion and wherein performing synchronization and channel estimation with all receive chains comprises processing the high throughput portion of the preamble.

4. The method of claim 3, wherein the legacy portion of the preamble comprises a short training field followed by a long training field and wherein activating additional receive chains occurs following reception of the short training field.

5. The method of claim 1, wherein the preamble comprises a short training field followed by a long training field and wherein activating additional receive chains occurs during the short training field.

6. The method of claim 5, further comprising performing synchronization with the single receive chain during the short training field after activating the additional receive chains.

7. The method of claim 6, further comprising providing synchronization information obtained for the single receive chain to the additional receive chains.

8. The method of claim 7, wherein performing synchronization and channel estimation with all receive chains comprises processing the long training field with all receive chains.

9. The method of claim 1, further comprising selecting the single receive chain from the multiple receive chains based at least in part on signal strength of at least one previously-received data packet.

10. The method of claim 1, further comprising selectively enabling the single chain search mode based on channel conditions determined by the wireless receiver.

11. A wireless receiver for receiving a transmitted data packet including a preamble and a data payload using a single chain search mode, wherein the wireless receiver comprises:
    multiple receive chains, each receive chain having automatic gain control and a signal processor for performing synchronization and channel estimation by processing the preamble of the data packet; and
    a chain controller configured to:
    activate a single receive chain to search for an incoming data packet,
    detect the preamble of the incoming data packet; and
    activate additional receive chains during reception of the preamble of the incoming data packet using automatic gain control determined during the preamble;
wherein the signal processors for all receive chains perform synchronization and channel estimation with all receive chains during the preamble of the incoming data packet to receive the data payload.

12. The wireless receiver of claim 11, wherein the chain controller is configured to provide automatic gain control information determined for the single receive chain to the additional receive chains for initiating automatic gain control with respect to the additional receive chains.

13. The wireless receiver of claim 11, wherein the preamble comprises a legacy portion and a high throughput portion and wherein all the receive chains are configured to perform synchronization and channel estimation by processing the high throughput portion of the preamble.

14. The wireless receiver of claim 13, wherein the legacy portion of the preamble comprises a short training field followed by a long training field and wherein the chain controller is configured to activate the additional receive chains following reception of the short training field.

15. The wireless receiver of claim 11, wherein the preamble comprises a short training field followed by a long training field and wherein the chain controller is configured to activate the additional receive chains during the short training field.

16. The wireless receiver of claim 15, wherein the signal processor of the single receive chain is configured to perform synchronization during the short training field after activating the additional receive chains.

17. The wireless receiver of claim 16, wherein the chain controller is further configured to provide synchronization information obtained for the single receive chain to the additional receive chains.

18. The wireless receiver of claim 17, wherein each signal processor of all the receive chains is configured to perform synchronization and channel estimation by processing the long training field.

19. The wireless receiver of claim 11, wherein the chain controller is configured to select the single receive chain from the multiple receive chains on the basis of signal strength of at least one previously-received data packet.

20. The wireless receiver of claim 11, wherein the chain controller is configured to selectively enable the single chain search mode based on channel conditions determined by the wireless receiver.

* * * * *